3,444,259
PROCESS FOR PREPARING DRYING RESINS FROM STEAM-CRACKED NAPHTHA
Stephan Ihnyckyj, Islington, Ontario, and John M. MacDonald, Sarnia, Ontario, Canada, assignors to Esso Research and Engineering Company, a corporation of Delaware
No Drawing. Filed Mar. 31, 1966, Ser. No. 538,993
Int. Cl. C07c 3/20; C08b 27/36
U.S. Cl. 260—680                 5 Claims

ABSTRACT OF THE DISCLOSURE

Liquid resins useful in forming coatings are prepared by polymerizing mixture of butadiene and $C_5$ stream-cracked petroleum stream with transition metal oxide catalyst.

---

This invention relates to the preparation of hydrocarbon drying resins having viscosities low enough to be used as coatings, varnishes and the like without the use of solvents or diluents.

It is known that butadiene can be polymerized to liquid resins containing a high degree of unsaturation by the use of alkali metal catalysts, such as sodium, or by alkyl metal catalysts such as butyl lithium. However, the viscosity of these resins is generally too high to permit their use without a solvent for coating purposes. See, for example, U.S. patents to Jaros, No. 2,849,510 and Van de Castle, No. 3,207,704.

It is also known that butadiene can be polymerized with a transition metal oxide catalyst, such as chromium oxide, to give drying oils. These polymers are likewise too viscous to be used as surface coatings without a solvent. These polymers also give unsatisfactory soft coatings when cured by heat. See, for example, Gaylord and Mark, "Linear and Stereoregular Addition Polymers," Interscience Publishers, Inc., New York, N.Y., 1959, p. 261.

It has now been discovered that liquid resins can be produced which have a sufficiently low viscosity so they can be used as surface coatings without diluting with solvents and which can be cured rapidly by heat to give a smooth, hard, baked finish, by copolymerizing butadiene with a low boiling steam-cracked naphtha fraction using a transition metal oxide catalyst.

The steam-cracked hydrocarbon fraction suitable for copolymerizing with butadiene is a $C_5$ fraction boiling from 90° to 140° F.

To obtain the selected and preferred feed streams to be copolymerized with butadiene, the $C_5$ fraction is initially processed to remove cyclopentadiene. This is accomplished by thermally soaking the $C_5$ fraction at 100 to 220° F. which dimerizes the cyclopentadiene. The dimers are removed by careful vacuum or steam distillation. The dimers are removed as bottoms from the distillation tower. The overhead $C_5$ fraction has the following composition:

|  | Weight percent |
|---|---|
| Isoprene | 5–50 |
| Piperylene | 0.1–30 |
| Other acyclic diolefins | 1–70 |
| Normal $C_5$ olefins | 10–25 |
| Tertiary olefins | 1–20 |
| Paraffins | 1–30 |

In accordance with the invention this fraction is then mixed with one to ten parts by weight of $C_5$ fraction per weight of butadiene and polymerized with the transition metal oxide catalyst, the ratio of butadiene to catalyst being in the range of 500 to 20 parts by weight of butadiene per weight of catalyst.

The transition metal oxides suitable for the copolymerization include the oxides of chromium, molybdenum, nickel, iron, thorium and vanadium. These oxides are generally supported on carriers, such as silica, alumina or combinations thereof. A particularly effective catalyst for this reaction is prepared by admixing a silica-alumina support with a chromium fluoride compound, e.g. chromic fluoride, chromous fluoride, and the like, and activating in an oxidizing atmosphere at a temperature of approximately 450 to 1,500° F. for a time generally ranging from five minutes to twenty hours or longer, preferably from thirty minutes to about ten hours, so that the chromium fluoride is converted to chromium oxide in which the chromium is at least partially in hexavalent state at the termination of the heating. While the term "support" is used to designate the silica-alumina portion of the catalyst of the invention, it is not meant to infer that this portion is inert since the activity of the total catalyst is affected by the nature and the composition of the support. The amount of silica in the silica-alumina portion can range from 5 to 99 weight percent, but is preferably in the range of about 80 to 95 weight percent and from 5 to 20 weight percent alumina. The silica-alumina portion is preferably a porous material, e.g., a gel suitable for impregnation. Commercially available cracking catalysts containing silica-alumina in the prescribed ratios are quite suitable.

The catalyst can be prepared by preparation methods known in the art, e.g. direct mixing of solid components, impregnation, etc. The support is preferably impregnated with a chromium fluoride compound in an aqueous solution or suspension in sufficient concentration to produce a finished catalyst having from 0.1 to 30 weight percent chromium based on the total weight of the catalyst, preferably from about 1 to 10 weight percent, but amounts outside these ranges can be employed, if desired. For maximum activity, it is most preferred that the chromium content of the catalyst be in the range of from 1 to 5 weight percent. The silica-alumina is mixed with the aqueous solution of chromium fluoride for a sufficient length of time to allow thorough impregnation. The excess solution is then removed and the catalyst is dried.

The impregnated catalyst is activated by heating at an elevated temperature for a sufficient length of time to increase the activity of the catalyst. This activation is effected in an oxidizing atmosphere at calcining temperatures of at least about 350° F. and not substantially greater than about 1,500° F. As a practical matter, a catalyst prepared by dry mixing is ordinarily activated at a temperature ranging from 350 to 1500° F. and a catalyst prepared by impregnation is ordinarily activated at a temperature ranging from about 450 to 1,500° F., preferably 750 to 1,500° F. The time of activation can vary over a broad range depending upon the temperature employed. Generally, the period of activation ranges from about five minutes to twenty hours or longer, preferably from thirty minutes to about ten hours. It is ordinarily preferred that the heating be conducted in the presence of an oxygen-containing gas such as air, which is preferably substantially free of water, for example, having a dew point below 75° F., and preferably below 0° F. The finished catalyst contains a substantial portion of the chromium in hexavalent form, preferably at least 0.1 weight precent based on the total catalyst of chromium being in the hexavalent state.

The polymerization reaction is conducted at temperatures in the range of 250 to 550° F., preferably 300 to 400° F., for a time between one and twenty-four hours, but preferably between two and eight hours if the reaction is carried out batchwise. A diluent such as a $C_5$ to $C_8$ aliphatic or aromatic hydrocarbon may be used if desired.

The product after removing the solvent is a yellow sharp smelling oil having a viscosity in the range of 1 to 4 stokes at 100° F. and is suitable for use as surface coating without the use of a diluent and can be applied by painting, dipping or spraying. When the coating is baked in the presence of air at 250° to 450° F. for one-fourth to four hours, a smooth, baked film is obtained which has a hardness greater than 4H pencil. Polybutadiene produced under the same reaction conditions gives an oily uneven cured surface which is softer than a 3B pencil, while the $C_5$ fraction polymerized alone under the same conditions gives a low viscosity oil which tends to quickly run off the surface if tilted from the horizontal. When cured, the surface is uneven and the film has a hardness between B and 3H pencil.

The essential features of the invention are illustrated by the following examples, although it is not intended to limit the invention thereto.

EXAMPLE 1

A steam cracked naphtha, B.P. 90° to 140° F. (623 g.), having the following composition:

| | Wt. Percent |
|---|---|
| Isoprene | 10–20 |
| Piperylene | 0.1–20 |
| Acyclic diolefins | 2–10 |
| $C_5$ diolefins | 10–25 |
| t-olefins | 2–15 |
| Paraffins | 10–30 | was introduced with butadiene (250 g.) and solvent cyclohexane (1,000 ml.) into a nitrogen flushed one gallon stainless steel autoclave. An activated chromium fluoride on silica:alumina catalyst (4 g.) was then added to the contents of the autoclave and the autoclave sealed. The stirrer was started and the contents of the autoclave quickly heated to 300° F. After being held at this temperature for four hours under autogenous pressure the autoclave contents were quickly cooled and discharged.

Removal of the solvent and light ends on a rotary evaporator left a pale pungent yellow oil which had a viscosity at 100° F. of 1.23 stokes and a specific viscosity (2.0 wt. percent in toluene) at 100° F. of 0.229.

The oil was painted on a metal plate with a camel's hair brush and cured in air at 275° F. for two hours. This gave a smooth baked surface which could be scratched with a 7H pencil lead but not a 6H pencil lead. Another sample prepared in the same manner and cured in air at 330° F. for one-half hour gave a smooth baked surface which was barely scratched with an 8H pencil lead.

EXAMPLE 2

Butadiene (250 g.) was polymerized in the absence of steam cracked naphtha employing similar reaction conditions to those given in Example 1 except that a six hour reaction time was used. After removal of solvent and light ends, a yellow, almost elastic semi-solid resin (26 g.) was obtained. This material had a specific viscosity (2.0 wt. percent in toluene) at 100° F. of 0.757.

The polybutadiene was spread with difficulty on a metal plate with a brush and cured in air at 275° F. for two hours. This gave an uneven, oily baked surface which could be broken by a 6B pencil lead. Curing in air at 330° F. did not improve the surface quality. Thus, at either temperature the polymer did not cure to a satisfactory film.

EXAMPLE 3

A steam cracked naphtha (1,483 g.) of the composition of Example 1 was polymerized in the absence of butadiene employing similar reaction conditions to those given in Example 1. After removal of solvent and light ends a thin straw colored liquid (162 g.) was obtained. This liquid had a viscosity of 0.39 stokes at 100° F. and a specific viscosity (2.0 wt. percent in toluene) at 100° F. of 0.042.

The liquid was spread on a horizontal metal plate (it rapidly ran off a vertical surface) and cured in air at 330° F. for one-half hour. This gave a crazed baked surface which could be scratched with a 4H pencil lead but not with a 3H pencil lead.

The nature of the present invention having thus been fully set forth and examples of the same given, what is claimed as new, useful and unobvious and desired to be secured by Letters Patent is:

1. A process for preparing a solventless coating having a viscosity in the range of 1–4 stokes at 100° F. which comprises the steps of admixing butadiene with 1–10 parts by weight per weight of butadiene of a $C_5$ steam-cracked petroleum stream boiling 90° to 140° F. and containing 5 to 50 weight percent isoprene, 0.1 to 30 weight percent piperylene, 1 to 20 weight percent other acyclic diolefins, 10 to 25 weight percent normal $C_5$ olefins, 1 to 20 weight percent tertiary olefins, 1 to 30 weight percent paraffins, polymerizing the resulting unsaturated mixture with a transition metal oxide catalyst supported on a carrier at a temperature from 250° to 550° F. and isolating the resin produced thereby.

2. The process of claim 1 in which the catalyst is an activated chromium fluoride on silica-alumina.

3. The process of claim 2 in which the catalyst is prepared by impregnating a silica-alumina support with a solution of a chromium fluoride compound in an amount sufficient to provide an impregnated catalyst having from 0.1 to 30 weight percent chromium based on the total composite, and heating the composite in an oxygen-containing atmosphere at a temperature above about 450° F. for a period of time sufficient to activate said catalyst and leave at least part of the chromium in the hexavalent state.

4. The process of claim 2 in which the catalyst is prepared by impregnating a silica-alumina support with a suspension of a chromium fluoride compound in an amount sufficient to provide an impregnated catalyst having from 0.1 to 30 weight percent chromium based on the total composite, and heating the composite in an oxygen-containing atmosphere at a temperature above about 450° F. for a period of time sufficient to activate said catalyst and leave at least part of the chromium in the hexavalent state.

5. The product of claim 1.

References Cited

UNITED STATES PATENTS

| 2,599,249 | 6/1952 | Friedman. | |
| 2,656,398 | 10/1953 | De Vault | 260—683.15 |
| 2,825,721 | 3/1958 | Hogan et al. | |

JAMES A. SEIDLECK, *Primary Examiner.*

U.S. Cl. X.R.

106—185; 117—132; 208—1; 260—80.7, 82